United States Patent
O'Dell et al.

(10) Patent No.: US 9,771,142 B2
(45) Date of Patent: Sep. 26, 2017

(54) SYSTEMS AND METHODS FOR PROVIDING VISUAL FEEDBACK IN AIRCRAFT

(71) Applicant: Gulfstream Aerospace Corporation, Savannah, GA (US)

(72) Inventors: Robert O'Dell, Savannah, GA (US); Frank Manochio, Savannah, GA (US); Jason A. Meade, Savannah, GA (US); Gary M. Freeman, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 270 days.

(21) Appl. No.: 14/496,016

(22) Filed: Sep. 25, 2014

(65) Prior Publication Data
US 2016/0090194 A1    Mar. 31, 2016

(51) Int. Cl.
| B64C 13/04 | (2006.01) |
| B64D 31/04 | (2006.01) |
| B64D 43/00 | (2006.01) |

(52) U.S. Cl.
CPC .............. *B64C 13/04* (2013.01); *B64D 31/04* (2013.01); *B64D 43/00* (2013.01)

(58) Field of Classification Search
CPC ................................. B64D 47/02; B64C 13/02
USPC ............................................................ 701/3
See application file for complete search history.

(56) References Cited

U.S. PATENT DOCUMENTS

| 3,675,880 | A | * | 7/1972 | Koch | ..................... B64D 31/04 244/234 |
| 3,848,833 | A |   | 11/1974 | Rauschelback | |
| 7,350,750 | B2 | * | 4/2008 | Beaujard | .................. B64C 9/32 244/213 |
| 8,223,039 | B2 | * | 7/2012 | Campagne | ............. B64D 31/04 340/945 |
| 8,235,330 | B2 | * | 8/2012 | Rozovski | ................ B64C 13/04 244/220 |
| 8,337,206 | B2 | * | 12/2012 | Taffet | ....................... G09B 9/16 362/471 |

(Continued)

FOREIGN PATENT DOCUMENTS

| EP | 1400426 A2 | 3/2004 |
| EP | 2816435 A2 | 12/2014 |
| WO | 9120022 | 12/1991 |

OTHER PUBLICATIONS

German Patent and Trademark Office, Office Action in Application No. 10 2015 116 175.3, dated Dec. 21, 2016.

*Primary Examiner* — McDieunel Marc
*Assistant Examiner* — James E Stroud
(74) *Attorney, Agent, or Firm* — Lorenz & Kopf, LLP, (LKGlobal)

(57) ABSTRACT

A system for providing visual feedback in an aircraft having an actuatable component includes a controller providing automatic control of the actuatable component in an automatic mode and permitting manual control of the actuatable component in a manual mode. A handle assembly is in communication with the actuatable component to provide manual control of the actuatable component in the manual mode. The system also includes a light panel integrated with the handle assembly, in communication with said controller, and configured to selectively illuminate to inform a user of the mode of the actuatable component.

20 Claims, 5 Drawing Sheets

(56) References Cited

U.S. PATENT DOCUMENTS 8,862,290 B1 * 10/2014 Ali ........................ G08G 5/02
701/16

* cited by examiner

SYSTEMS AND METHODS FOR PROVIDING VISUAL FEEDBACK IN AIRCRAFT

TECHNICAL FIELD

The technical field relates to systems and method for providing visual feedback regarding operation of a vehicle, particularly to an aircraft.

BACKGROUND

Modern aircraft are extremely complex machines with a high number of automatic and manually actuated systems. These systems utilize lights, displays, gauges, speakers, and other annunciators to convey critical information to the pilots and other users of the aircraft. However, with such a high number of systems, it is often difficult for the pilots and other users to be quickly alerted to the most pressing issues regarding operation of the aircraft.

As such, it is desirable to present systems to quickly alert users of changes in operation of the aircraft. In addition, other desirable features and characteristics will become apparent from the subsequent summary and detailed description, and the appended claims, taken in conjunction with the accompanying drawings and this background.

BRIEF SUMMARY

A system for providing visual feedback in an aircraft having an actuatable component. The system includes a controller providing automatic control of the actuatable component in an automatic mode and permitting manual control of the actuatable component in a manual mode. A handle assembly is in communication with the actuatable component to provide manual control of the actuatable component in the manual mode. The system also includes a light panel integrated with the handle assembly, in communication with said controller, and configured to selectively illuminate to inform a user of the mode of the actuatable component.

A computerized method for providing visual feedback in an aircraft having an actuatable component and a handle assembly for manually controlling the actuatable component. The method includes assigning a mode of operation of the actuatable component, wherein control of the actuatable component is performed automatically by a controller in an automatic mode and control of the actuatable component is performed manually by a user in a manual mode. The method also includes selectively illuminating a light panel integrated with the handle assembly in accordance with the mode of operation of the actuatable component to inform the user of the mode of operation of the actuatable component.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the figures, wherein like numerals indicate like parts throughout the several views, a system 100 and method for providing visual feedback in an aircraft 102 is shown and described herein.

The aircraft 102 described herein is a fixed-wing airplane. However, the system 100 and method described may be applied to other types of aircraft, such as a helicopter. The system 100 and method may also be applied to other vehicles, e.g., automobiles, motorcycles, ships, and/or locomotives.

Figure 1:
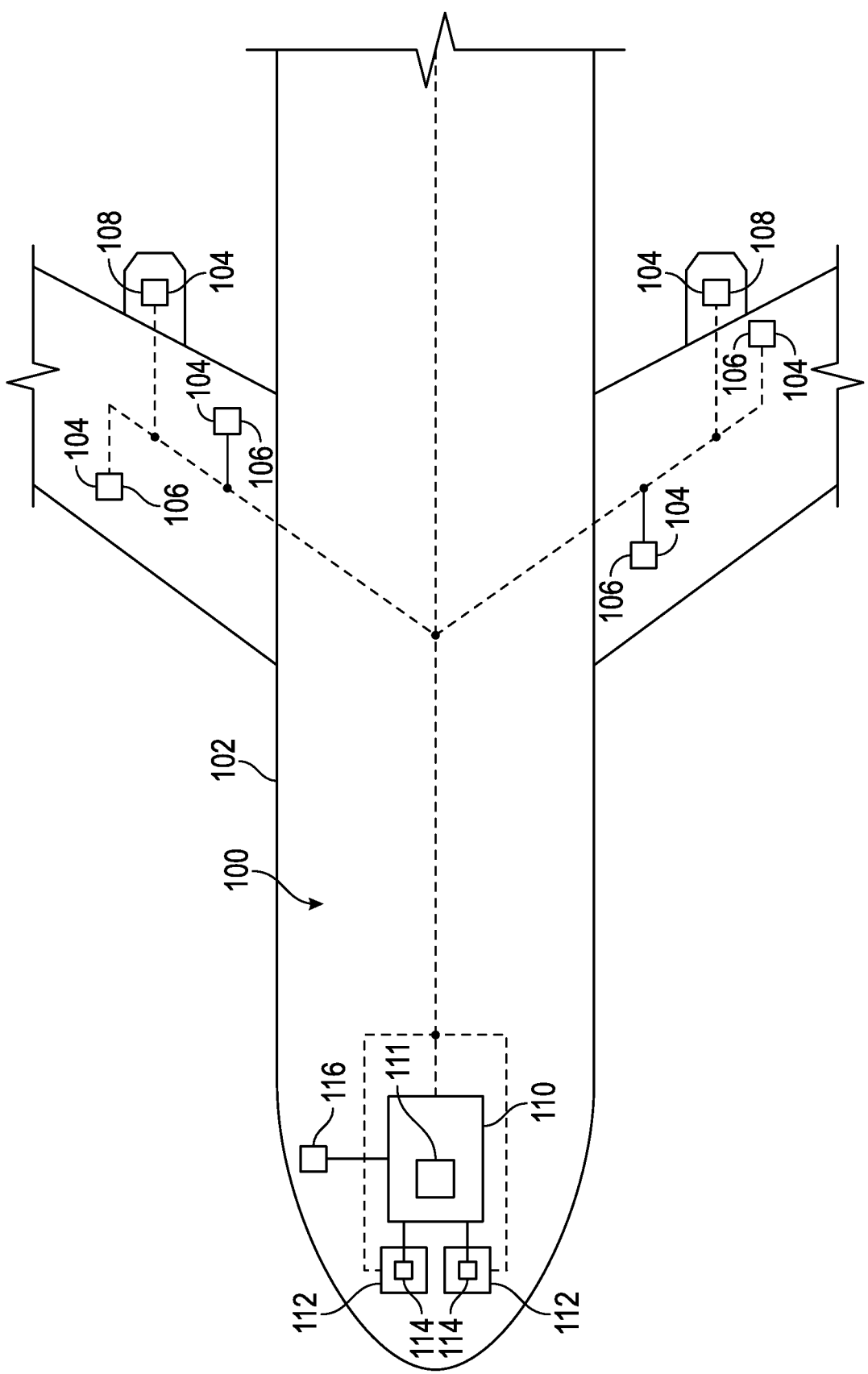
FIG. 1 is a block diagram of a system for providing visual feedback implemented in an aircraft according to one embodiment.

Referring to FIG. 1, the aircraft 102 includes an actuatable component 104. Commonly, aircraft 102 include numerous actuatable components 104, including, but certainly not limited to, flight control surfaces 106 for controlling the attitude of the aircraft 102 and engines 108 for controlling thrust. The flight control surfaces 106 may include, but are not limited to, ailerons, elevators, rudders, spoilers, flaps, and slats (none of which are separately numbered). It should be appreciated that although the aircraft may include multiple actuatable components 104, the term "actuatable component" may be presented as a singular actuatable component 104 and/or a plurality of actuatable components 104 herein.

The system 100 includes a controller 110 for facilitating control of various systems, devices, and/or components of the aircraft 102. The controller 110 of the exemplary embodiment includes a processor 111, e.g., a microprocessor capable of performing calculations, executing instructions (i.e., running a program), and/or otherwise manipulating data. The controller 110 may be implemented with a plurality of processors, as is appreciated by those skilled in the art. Further, the aircraft 102 may include a plurality of controllers 110, separate from one another or coupled to one another, for controlling the various systems, devices, and/or components.

The controller 110 is in communication with the actuatable components 104. For instance, the controller 110 may be electrically connected to the actuatable components 104 such that control signals may be sent from the controller 110 to each actuatable component 104 for control thereof.

The controller 110 provides automatic control of the actuatable component 104 in an automatic mode. That is, in the automatic mode, the controller 110 controls typical operation of the actuatable component 104 without constant human intervention. As stated previously, such automatic control is routine in aircraft 102. For instance, the controller 110 may function as the "auto-pilot" to control direction, attitude, and/or elevation of the aircraft 102. The controller 110 may also, or alternatively, function as the "auto throttle" for controlling engine 108 speed, and thus, thrust, of the aircraft 102. Accordingly, the controller 110 may be in communication with various sensors and systems of the aircraft 102, including, but not limited to, a global position system ("GPS") receiver, an engine speed sensor, and an altimeter.

The controller 110 also permits manual control of the actuatable component 104 in a manual mode. That is, the controller 110 permits the actuatable component 104 to be actuated by a user, instead of via the program being run by the processor. In order to facilitate the automatic and manual modes, the controller 110 may internally assign the automatic mode or the manual mode to each actuatable component 104.

The system 100 of the aircraft 102 includes a handle assembly 112 for manual control of the actuatable component 104. More specifically, the handle assembly 112 is in communication with the actuatable component 104 to provide manual control of the actuatable component 104 in the manual mode. The handle assembly 112 produces one or more signals related to the control of the actuatable component 104. In one embodiment, the controller 110 may receive the signals from the handle assembly 112 and transmit a related signal to the actuatable component 104. However, in other embodiments, the handle assembly 112 sends signals directly to the actuatable component 104, i.e., bypassing the controller 110.

A light panel 114 is integrated with the handle assembly 112. That is, the light panel 114 is incorporated as part of the handle assembly 112 such that the light panel 114 may be seen by the user when observing the handle assembly 112. The light panel 114 is in communication with the controller 110 and configured to selectively illuminate to inform the user of the mode of the actuatable component 104. Examples of components of the light panel 114, implementation with the handle assembly 112, and operation thereof are described in further detail below.

Figure 2:
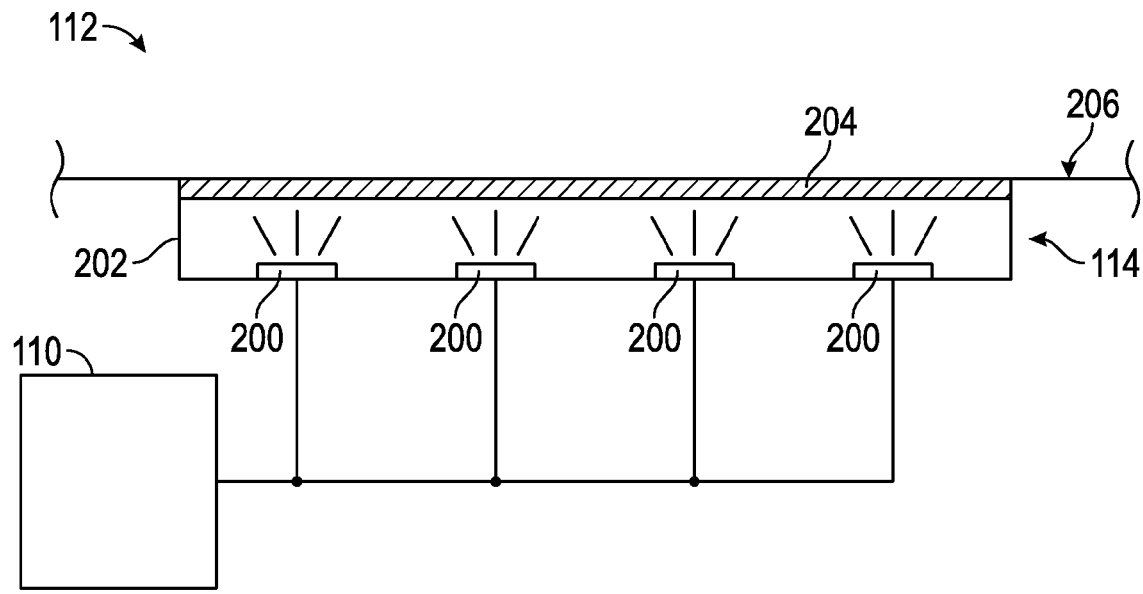
FIG. 2 is a block diagram of a light panel integrated with a handle assembly according to one embodiment.

In one embodiment, the light panel 114 includes a plurality of light emitting diodes (LEDs) 200 electrically connected to the controller 110, as shown in FIG. 2. In this embodiment, the LEDs 200 are disposed in a housing 202. The housing 202 is encased by a window 204 substantially flush with a surface 206 of the handle assembly 112. However, it should be appreciated that the light panel 114 may be implemented with any suitable lighting devices, including, but certainly not limited to, incandescent and fluorescent sources. It is also to be appreciated that the light panel 114 may include reflective surfaces, lenses, and other structural components to direct and/or magnify the light generated by the LEDs 200 and/or other light sources.

In the exemplary embodiments described below, and shown in FIGS. 3-5, the light panel 114 has a curvilinear shape. More specifically, the light panel 114 has a length greater than its width and curves to conform to the shape or shapes of the handle assembly 112. However, in other embodiments (not shown), the shape, structure, and appearance of the light panel 114 may be different.

Figure 3:
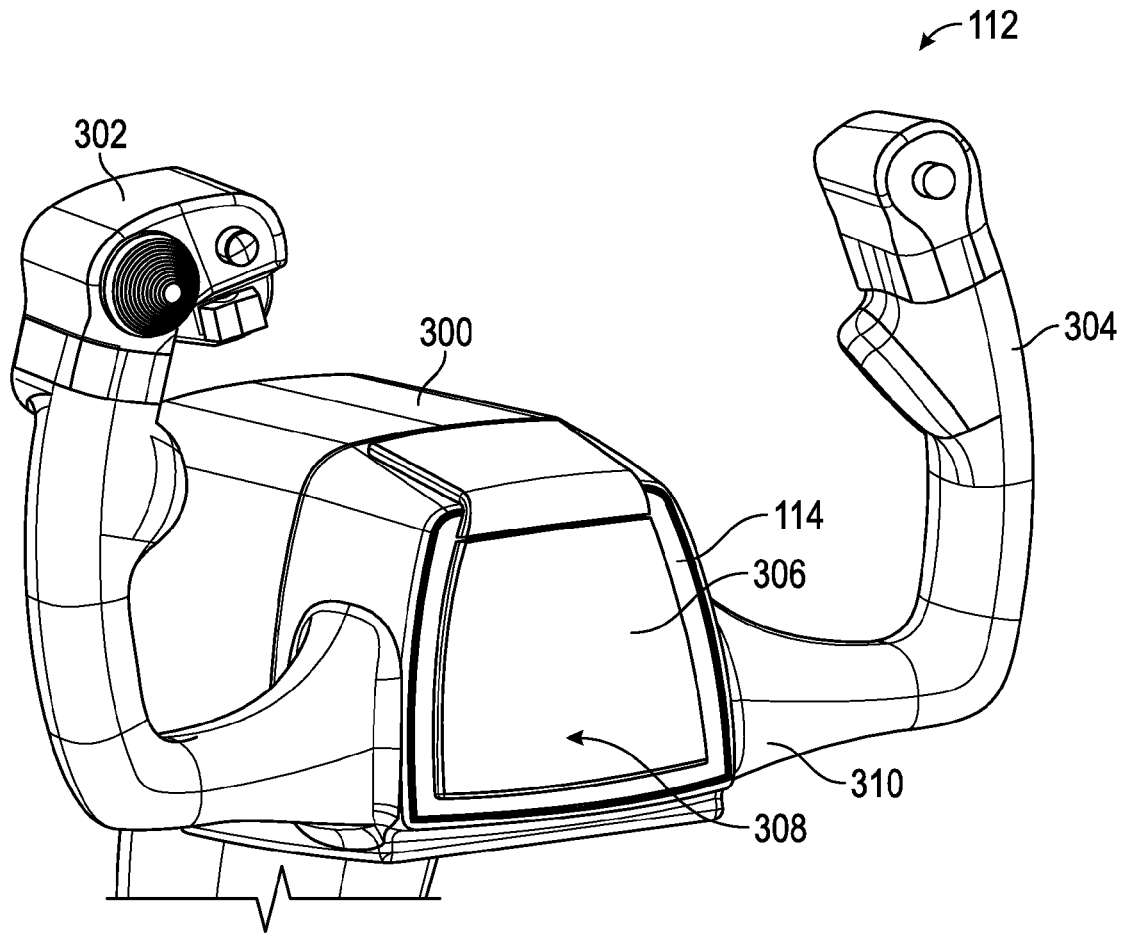
FIG. 3 is a perspective view of the light panel integrated with a yoke assembly according to one embodiment.

Referring to FIG. 3, the handle assembly 112 of this embodiment is implemented as a yoke assembly 300, often referred to simply as the "yoke" or the "control column". The yoke assembly 300 is typically utilized to control the attitude of the aircraft 102, e.g., pitch and roll of the aircraft 102.

The yoke assembly 300 shown in FIG. 3 includes a left handle 302, a right handle 304, and a center portion 306 disposed between the left and right handles 302, 304. The center portion 306 serves to support and maintain separation between the left and right handles 302, 304. In this embodiment, the center portion 306 includes a front surface 308 defining a periphery 310. The light panel 114 is integrated with the center portion 306. More specifically, as shown in FIG. 3, the light panel 114 is curvilinear and is disposed adjacent at least a portion of the periphery 310 of the front surface 308 of the center portion 306.

Figure 4:
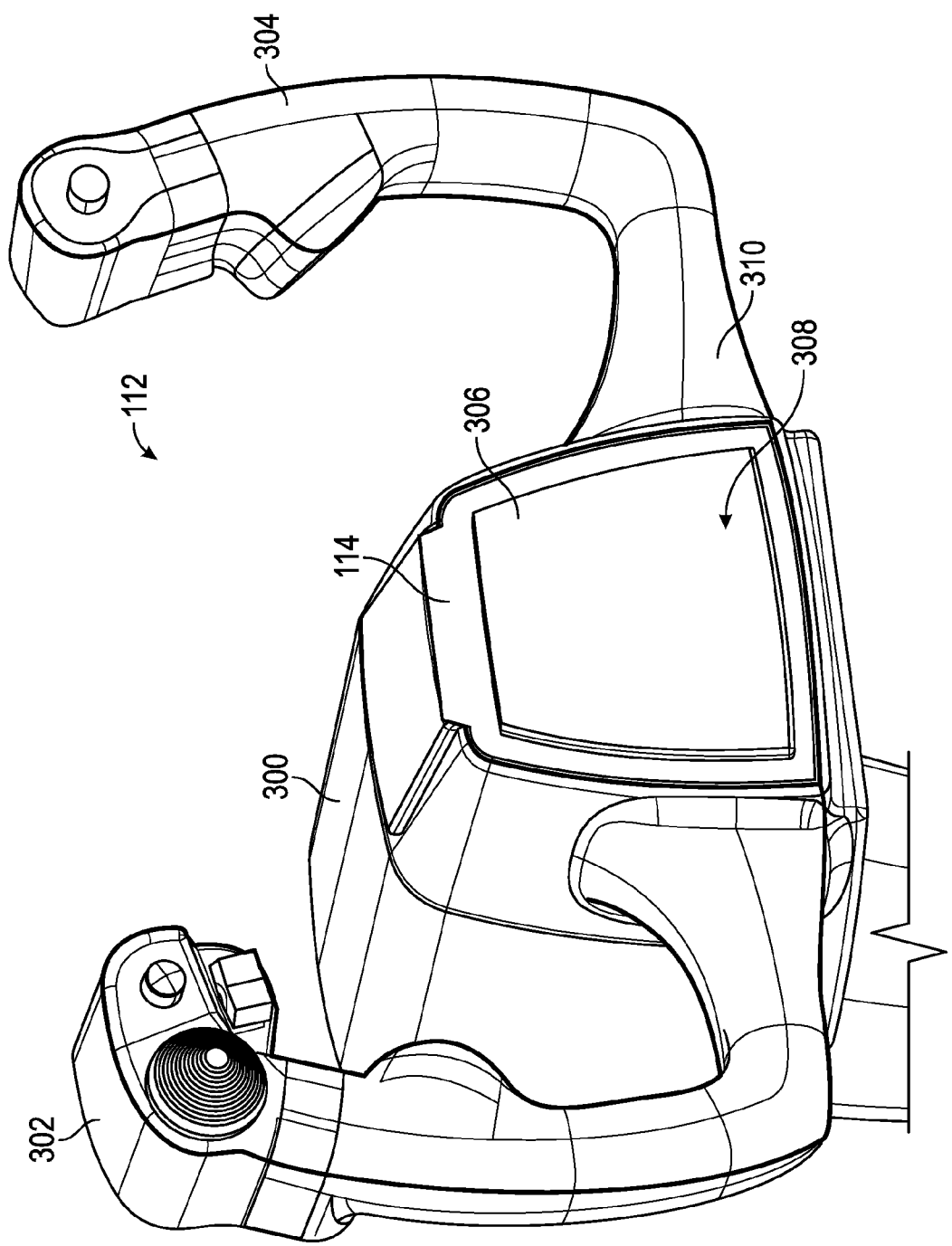
FIG. 4 is a perspective view of the light panel integrated with the yoke assembly according to another embodiment.

FIG. 4 illustrates another embodiment of the yoke assembly 300. In this particular embodiment, the light panel 114 is curvilinear and integrated with the center portion 306, the left handle 302, and the right handle 304. The light panel 114 of this embodiment is formfitting with the surfaces (not numbered) of the handles 302, 304 such that it is not distracting when gripped by the user, but is visually noticeable, particularly when illuminated.

Figure 5:
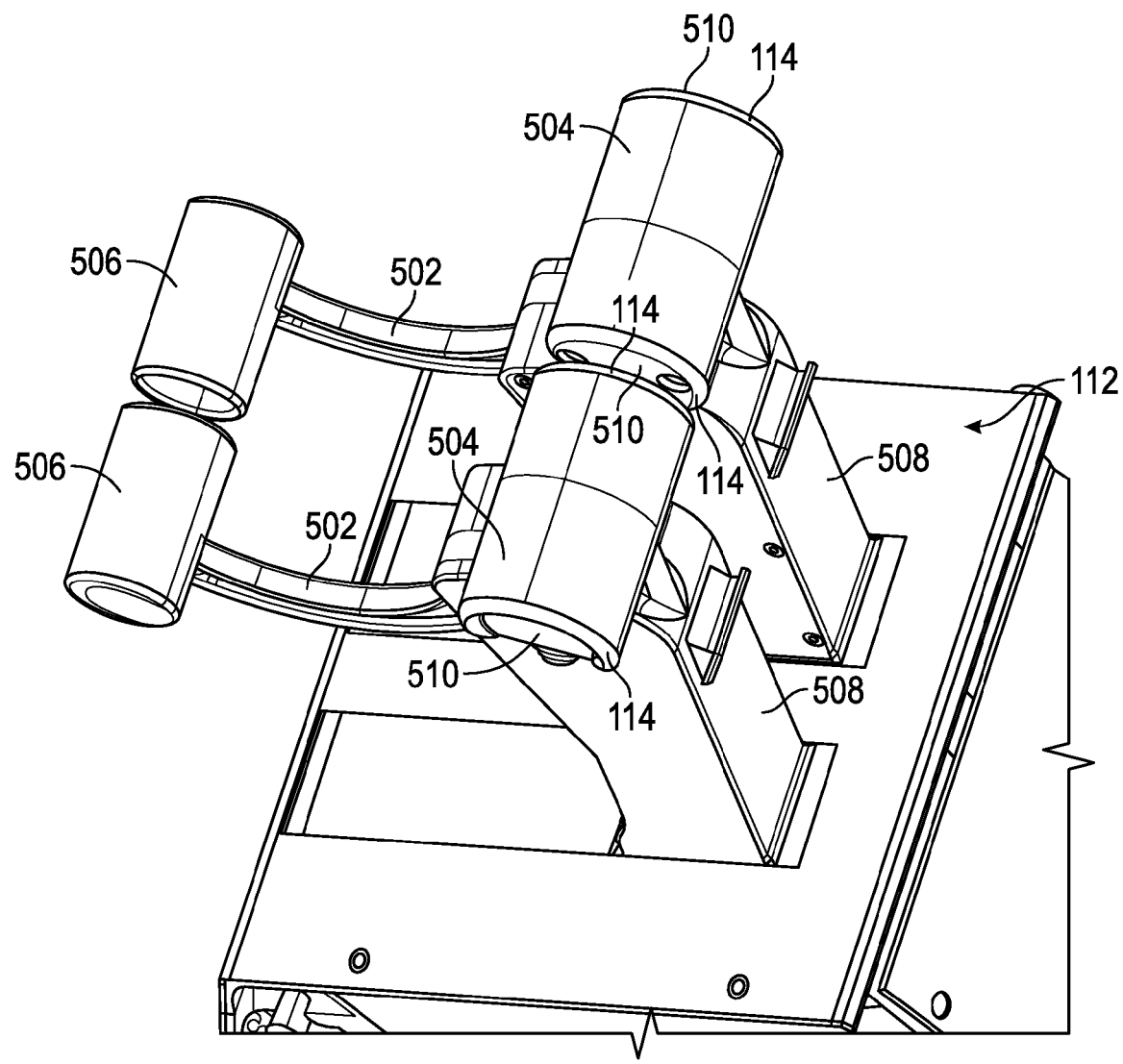
FIG. 5 is a perspective view of the light panel integrated with a throttle control according to one embodiment.

Referring now to FIG. 5, the handle assembly 112 in this embodiment is implemented as a throttle control 500. The throttle control 500 is typically used to control the speed of the engines 108, and thus, the thrust provided by the engines 108.

In the exemplary embodiment shown in FIG. 5, the throttle control includes a pair of levers 502. Each lever 502 corresponds to one of the engines 108. Each lever 502 includes an end (not numbered) operatively connected to a cylindrical element 504, such that the lever 502 rotatable at least partially around the cylindrical element 504. A handhold 506 is coupled to another end (not numbered) of the lever 502. In this particular embodiment, each cylindrical element 504 is supported by a podium structure 508 for elevating the lever 502, cylindrical element 504, and handhold 506 to a convenient position for actuation by the user.

Each cylindrical element 504 is cylindrically shaped and includes a pair of generally flat, circular plates 510. In this particular embodiment, the light panels 114 are curvilinear in shape and disposed adjacent a periphery (not numbered) of each plate 510. However, the location, shape, size, and other characteristics of the light panels 114 may be different in other embodiments of the system 100.

Figure 6:
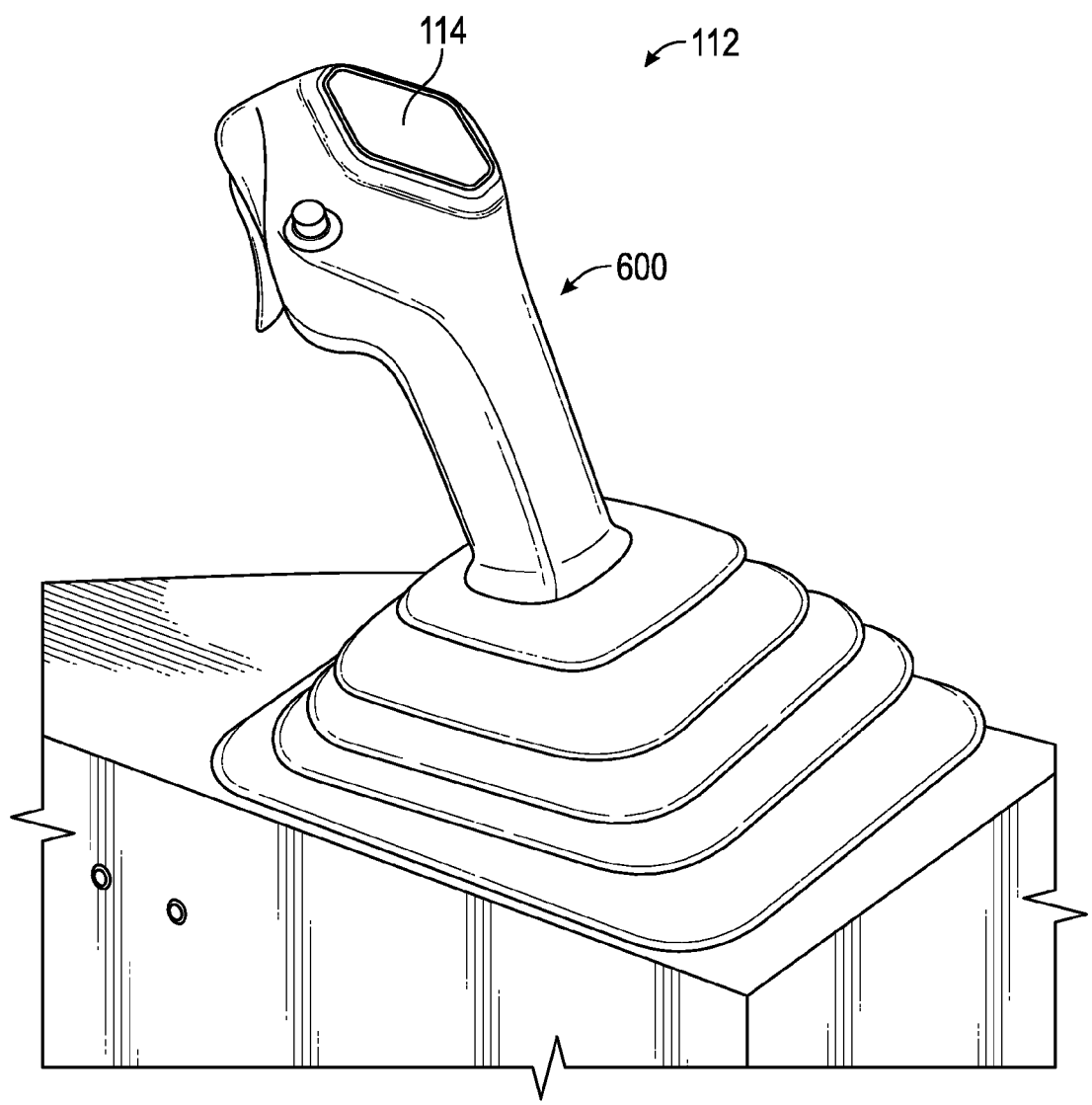
FIG. 6 is a perspective view of the light panel integrated with a sidestick control according to one embodiment.

Referring now to FIG. 6, the handle assembly 112 in this embodiment is implemented as a sidestick control 600. Particularly, the light panel 114 in this embodiment is implemented as a rhombus-shaped generally flat surface. Of course, as previously stated, the location, shape, size and other characteristics of the light panel 114 may be different in other embodiments of the system 100.

In other embodiments (not shown), the light panel 114 may be integrated with a push button, switch, or other input device that is integrated with the handle assembly 112.

The changing of the modes of the actuatable component 104 may be reflected in a change in illumination of the light panel 114. In one embodiment of the system 100, the light panel 114 is configured to illuminate multiple colors. For example, the LEDs 200 of the light panel 114 of one embodiment may be configured to illuminate a first color and a second color, with the second color being different from the first color. The different colors refer to light at different wavelengths such that the difference in color is perceptible to humans.

In this particular embodiment, the light panel 114 illuminates the first color in response to the automatic mode being assigned to the actuatable component 104 and illuminates the second color in response to the controller 110 assigned the manual mode. As such, a different color is illuminated by the light panel to distinguish between the different modes.

As one example, the light panel 114 may illuminate a green color when the actuatable component 104 is in in automatic mode and may illuminate a yellow color when the actuatable component 104 is in the manual mode. For instance, with reference to FIGS. 3 and 4, the light panel 114 integrated with the handle assembly 112 may glow green when the auto-pilot is active and the associated actuatable components 104 are being controlled automatically by the controller 110. When the auto-pilot is inactive, then the light panel 114 may glow yellow to indicate that manual control of the actuatable components associated with the handle assembly 112 may be performed with the handle assembly 112.

Of course, other colors illuminated by the light panel 114 may be utilized, besides the green and yellow colors described above. As just one of many examples, the light panel 114 may illuminate white when the auto-pilot is active and may illuminate red when the auto-pilot is deactivated.

In another embodiment, the change in illumination of the light panel 114 may be performed with a single color of light. For instance, the light panel 114 may turn on the light panel 114 in response to the automatic mode being assigned to the actuatable component 104 and turn off the light panel 114 in response to the manual mode being assigned.

As another instance, illumination of the light panel 114 may change by flashing, i.e., turning on and off, based on the mode. For example, the light panel 114 may be continuously illuminated when the actuatable component 104 is assigned to the automatic mode and may flash when the actuatable component 104 is assigned the manual mode.

As yet another instance, illumination of the light panel 114 may change by varying the intensity of the light based on the mode. For example, the light panel 114 may be illuminated at a constant intensity when the actuatable component 104 is assigned to the automatic mode and may oscillate in intensity when the actuatable component 104 is assigned the manual mode.

Referring again to FIG. 1, the system 100 may include a sensor 116 in communication with the controller 110 for sensing one or more conditions of the aircraft 102. For instance, the sensor 116 may be an accelerometer that may sense unexpected change in flight conditions, e.g., turbulence. The sensor 116 may alternatively be a temperature sensor for sensing temperature, a speedometer for sensing speed, or any other applicable sensor 116 as is appreciated by those skilled in the art. Of course, the system 100 and/or the aircraft 102 may include a plurality of sensors 116.

The controller 110 may automatically switch from the automatic mode to the manual mode without user intervention. That is, the controller 110 may change the assignment of the actuatable component 104 from the automatic mode to the manual mode in response to a predetermined condition. For example, autopilot control over one or more actuatable components 104 may be automatically and unexpectedly terminated if turbulence is detected, e.g., by the sensor 116.

In one embodiment, the light panel 114 illuminates a color in response to the controller 110 switching assignment of the actuatable component 104 from the automatic mode to the manual mode due to the predetermined condition. For example, in one embodiment, the light panel 114 integrated with the yoke assembly 300 may be illuminated as green when the autopilot is engaged (i.e., when the actuatable components 104 are in the automatic mode). When the actuatable component 104 is switched to the manual mode due to the predetermined condition, e.g., due to turbulence, the light panel 114 may blink red or yellow to alert the pilot that the autopilot has automatically disengaged.

A different color, flash pattern, and/or other configuration may be utilized to differentiate a routine switch of the actuatable component 104 from the automatic mode to a manual mode (e.g., the user turning off the auto-pilot system) and an unexpected switch from the automatic mode to the manual mode (e.g., due to turbulence or system failure). As such, the user can quickly and easily identify that an unexpected switch from the automatic mode to the manual mode has occurred and take any necessary steps to control the aircraft 102 and/or remedy the situation.

One embodiment of the computerized method (not shown) for providing visual feedback in the aircraft 102 is described above with respect to the described system 100, where the aircraft includes an actuatable component 104 and a handle assembly 112 for manually controlling the actuatable component 104. However, it is should be appreciated the computerized method may be implemented is situations different from the system 100 described above.

The computerized method includes assigning a mode of operation of the actuatable component 104, wherein control of the actuatable component is performed automatically by a controller 110 in an automatic mode and control of the actuatable component is performed manually by a user in a manual mode. The method also includes selectively illuminating a light panel 114 integrated with the handle assembly 112 in accordance with the mode of operation of the actuatable component 104 to inform the user of the mode of operation of the actuatable component 104.

The computerized method may also include automatically switching from the automatic mode to the manual mode in response to a predetermined condition. The predetermined condition may correspond to an abnormal condition of the aircraft 102, e.g., an engine failure, unexpected turbulence, or a system fault. In response to the automatic switching between modes, the method includes selectively illuminating the light panel.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A system for providing visual feedback for an aircraft having an actuatable component, said system comprising:
   a controller providing automatic control of the actuatable component in an automatic mode and permitting manual control of the actuatable component in a manual mode;
   a handle assembly in communication with the actuatable component to provide manual control of the actuatable component in the manual mode; and
   a light panel integrated with said handle assembly, in communication with said controller, and configured to selectively illuminate to inform a user of the mode of the actuatable component.

2. The system set forth in claim 1, wherein the actuatable component comprises a plurality of flight control surfaces and wherein said handle assembly comprises a yoke assembly.

3. The system as set forth in claim 2, wherein said yoke assembly includes a left handle, a right handle, and a center connecting portion disposed between said left and right handles.

4. The system as set forth in claim 3, wherein said light panel is integrated with said center connecting portion.

5. The system as set forth in claim 3, wherein said light panel is integrated with said center connecting portion, said left handle, and said right handle.

6. The system as set forth in claim 1, wherein the actuatable component comprises an engine throttle and wherein said handle assembly comprises a throttle control.

7. The system as set forth in claim 1, wherein said light panel comprises a plurality of light emitting diodes (LEDs) configured to illuminate a first color and a second color different from the first color.

8. The system as set forth in claim 1 wherein said light panel is curvilinear.

9. The system as set forth in claim 1 wherein said light panel illuminates a first color in response to the automatic mode being activated and illuminates a second color different from the first color in response the manual mode being activated.

10. The system as set forth in claim 1, wherein said controller automatically switches from the automatic mode to the manual mode in response to a predetermined condition.

11. The system as set forth in claim 10, wherein said light panel illuminates a color in response to said controller switching from the automatic mode to the manual mode due to the predetermined condition.

12. The system as set forth in claim 1, wherein the actuatable component comprises a plurality of flight control surfaces and wherein said handle assembly comprises a sidestick control.

13. An aircraft comprising:
   an actuatable component;
   a controller providing automatic control of said actuatable component in an automatic mode and permitting manual control of said actuatable component in a manual mode;
   a handle assembly in communication with said actuatable component to provide manual control of said actuatable component in the manual mode; and
   a light panel integrated with said handle assembly, in communication with said controller, and configured to selectively illuminate to inform a user of the mode of said actuatable component.

14. The aircraft as set forth in claim 13, wherein the actuatable component comprises a plurality of flight control surfaces and wherein said handle assembly comprises a yoke assembly.

15. The aircraft as set forth in claim 13, wherein the actuatable component comprises an engine throttle and wherein said handle assembly comprises a throttle control.

16. The aircraft as set forth in claim 13, wherein said controller automatically switches from the automatic mode to the manual mode in response to a predetermined condition.

17. The aircraft as set forth in claim 16, wherein said light panel illuminates a color in response to said controller switching from the automatic mode to the manual mode due to the predetermined condition.

18. A computerized method for providing visual feedback for an aircraft having an actuatable component and a handle assembly for manually controlling the actuatable component, said method comprising:
   assigning a mode of operation of the actuatable component wherein control of the actuatable component is performed automatically by a controller in an automatic mode and control of the actuatable component is performed manually by a user in a manual mode; and
   selectively illuminating a light panel integrated with the handle assembly in accordance with the mode of operation of the actuatable component to inform the user of the mode of operation of the actuatable component.

19. The computerized method as set forth in claim 18, further comprising automatically switching from the automatic mode to the manual mode in response to a predetermined condition.

20. The computerized method as set forth in claim 19, wherein selectively illuminating the light panel comprises illuminating the light panel in response to the automatic switching from the automatic mode to the manual mode due to the predetermined condition.

\* \* \* \* \*